United States Patent
Healy et al.

(10) Patent No.: US 8,180,799 B1
(45) Date of Patent: May 15, 2012

(54) DYNAMICALLY CREATING TABLES TO STORE RECEIVED DATA

(75) Inventors: James J. Healy, Apex, NC (US); David Richard Conorozzo, Cary, NC (US)

(73) Assignee: FormRouter Inc., Cary, NC (US)

( * ) Notice: Subject to any disclaimer, the term of this patent is extended or adjusted under 35 U.S.C. 154(b) by 159 days.

(21) Appl. No.: 12/758,634

(22) Filed: Apr. 12, 2010

Related U.S. Application Data

(60) Provisional application No. 61/170,431, filed on Apr. 17, 2009.

(51) Int. Cl.
*G06F 17/30* (2006.01)
(52) U.S. Cl. ......... 707/791; 707/802; 707/822; 707/808
(58) Field of Classification Search ........... 707/600–831
See application file for complete search history.

(56) References Cited

U.S. PATENT DOCUMENTS 7,761,570 B1 * 7/2010 Halley .......................... 709/226
* cited by examiner

*Primary Examiner* — Isaac M Woo
(74) *Attorney, Agent, or Firm* — Fish & Richardson P.C.

(57) ABSTRACT

Methods, systems, and apparatus for dynamically creating tables to store received data. A form that includes data of one or more data types is received. Each of the data types is associated with a corresponding field type. The data types in the form are identified, and a storage location configured to store data of the field-type is accessed. Field types in the storage location are compared with those of the received data, and on determining that a portion of the data is of a data type that the storage location is not configured to store, the storage location is modified to store that portion of the data.

20 Claims, 7 Drawing Sheets

DYNAMICALLY CREATING TABLES TO STORE RECEIVED DATA

CROSS-REFERENCE TO RELATED APPLICATIONS

This application claims priority to U.S. Patent Application No. 61/170,431, entitled "Dynamically Creating Tables to Store Received Data," which was filed on Apr. 17, 2009. The entire contents of U.S. Patent Application No. 61/170,431 are incorporated herein by reference in its entirety.

TECHNICAL FIELD

This specification relates to storing data, particularly, in computer-readable tables created dynamically in response to receiving data, for example, through electronic forms.

BACKGROUND

Electronic forms include fields into which data can be entered. The forms can be designed to extract the data from the fields and store the extracted data in databases. For example, a software application can provide an electronic form that includes fields into which a user can enter personal information. In response to user input, the form, including the data, is transmitted to a database that includes one or more computer-readable tables configured to store the data entered by the user in the electronic form. Software applications can be encoded to extract the data entered by the user in the fields of the form and store the data in the tables in the database. In many situations, the software applications set up table and field mapping for each field on a form to collect data into one specific database or storage format. The database used to collect form responses can be proprietary to the form software application. Further, the table and field mapping can be defined in advance of collecting data to a database or storage format.

SUMMARY

This specification describes technologies relating to dynamically creating tables to store received data.

An innovative aspect of the subject matter can be implemented as a method executed by data processing apparatus. A form that includes data of one or more data types is received. Each of the one or more data types is associated with a corresponding field type. The one or more data types of the data included in the form are identified. A computer-readable storage location configured to store data of at least one field type is accessed. The one or more field types that the storage location is configured to store are identified. The identified one or more data types are compared against the identified one or more field types. It is determined that a portion of the data is of a data type corresponding to a first field type that the storage location is not configured to store. The storage location is modified to store data of the data type corresponding to the first field type triggered in response to determining that the portion of the data is of a data type corresponding to a first field type that the storage location is not configured to store. The modification configures the storage location to store the portion of the data of the first field type. The received data is stored in the modified storage location.

This, and other aspects, can include one or more of the following features. The modifying can include creating, in the storage location, the first field type in addition to the one or more field types that the storage location is configured to store. The modifying can include converting a field type of the one or more field types to the first field type. Converting the field type of the one or more field types to the first field type can include determining, from the one or more data types, a first size associated with a data type corresponding to the first field type, determining a second size associated with the field type of the one or more field types that is to be modified, and modifying the second size to the first size. The received data can be extracted from the form prior to storing the received data in the modified storage location. The received form can be scanned to determine one or more field types of the data that is included in the form. The storage location can be a computer-readable table.

Other innovative aspects of the subject matter can be implemented as a computer-readable medium tangibly encoding computer software instructions executable by data processing apparatus to perform the aforementioned operations. Further innovative aspects of the subject matter can be implemented as a system that includes data processing apparatus and a computer-readable medium tangibly encoding computer software instructions executable by the data processing apparatus to perform the aforementioned operations.

Another innovative aspect of the subject matter can be implemented as a system that includes a form inspection unit to receive a form that includes data of one or more data types. Each of the one or more data types are associated with a corresponding field type. The system includes a data storage unit to receive the data from the form inspection unit and to store the data of at least one field type. The system includes a storage modification unit operatively coupled to the form inspection unit and the data storage unit. The storage modification unit is configured to perform operations that include identifying the one or more data types of the data included in the form, identifying the one or more field types that the data storage unit is configured to store, comparing the identified one or more data types against the identified one or more field types, determining that a portion of the data is of a data type corresponding to a first field type that the data storage unit is not configured to store, and modifying the data storage unit to store data of the data type corresponding to the first field type triggered in response to determining that the portion of the data is of a data type corresponding to a first field type that the storage location is not configured to store. The modifying configures the storage location to store the portion of the data of the first field type. The data storage unit is configured to store the data pursuant to the modifying by the storage modification unit.

This, and other aspects, can include one or more of the following features. The form inspection unit can further include a form receiver to receive the form from an external source. The form can include a descriptor indicating that the form includes data of a data type corresponding to the first field type. The form inspection unit can further include a descriptor database including one or more descriptors. Each descriptor can correspond to a type of modifying to be performed on the data storage unit. The descriptor database can be configured to extract the descriptor included in the form. The form inspection unit can include a data transmitter configured to transmit the data to the data storage unit. The data transmitter can transmit the data to the data storage unit upon receiving an indication from the descriptor identifier related to the modifying of the received data. The storage modification unit can include a descriptor receiver to receive the descriptor from the form inspection unit and a storage creation unit to create one or more field types including the first field type in the data storage unit based upon the received descriptor. The storage modification unit can include a field modification unit to modify a field type of the one or more field types to another field type. The other field type can be the first field type. The field modification unit can include a field-type addition unit configured to create the first field type in the data storage unit.

Particular embodiments of the subject matter described in this specification can be implemented so as to realize one or more of the following advantages. The techniques described in the present specification can enable determining table, field, and field type of data received in a form by automatically interrogating the structure of the form and/or by interpreting the data included in the form. This can allow dynamically mapping the data to a storage location or storage format. Subsequent to the interrogation process, tables or fields or both can be created or modified or both, thereby enabling dynamically writing data to one or many different storage locations, for example, storage locations located in different geographic locations. Doing so can decrease the administrator's dependence on the final storage destination and/or the field types, when the administrator creates forms to receive data. The structures of several popular electronic form formats can be interrogated using the techniques described here, allowing the creation of forms in many different formats and the collection of forms from users who any commercially available storage locations. Further, database administrators can simultaneously collect data from different form formats into one or many storage locations, in different locations, or on different computer platforms. Furthermore, a form administrator can change the storage locations to which one or more forms are writing data mid-stream while data collection is in progress. In addition, the choice of form format, the choice of data output format, the ability to change field types in forms during a data collection process, and the ability to change the form structure during a data collection process can be preserved.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An electronic form (henceforth referred to as a form) can receive data of one or more field types that include numerical, text, date, character, and the like. In some scenarios, a relationship between a field type of data that the form is configured to receive and a format in which data of the field type will be stored is defined in the form prior to receiving data in the form. In such scenarios, when data is entered into the form, the format in which the data is to be stored can be determined based on the relationship. The techniques with reference to the following figures describe receiving data into a form in which the relationship between the field type of data and the format in which data will be stored is not defined in advance.

Figure 1:
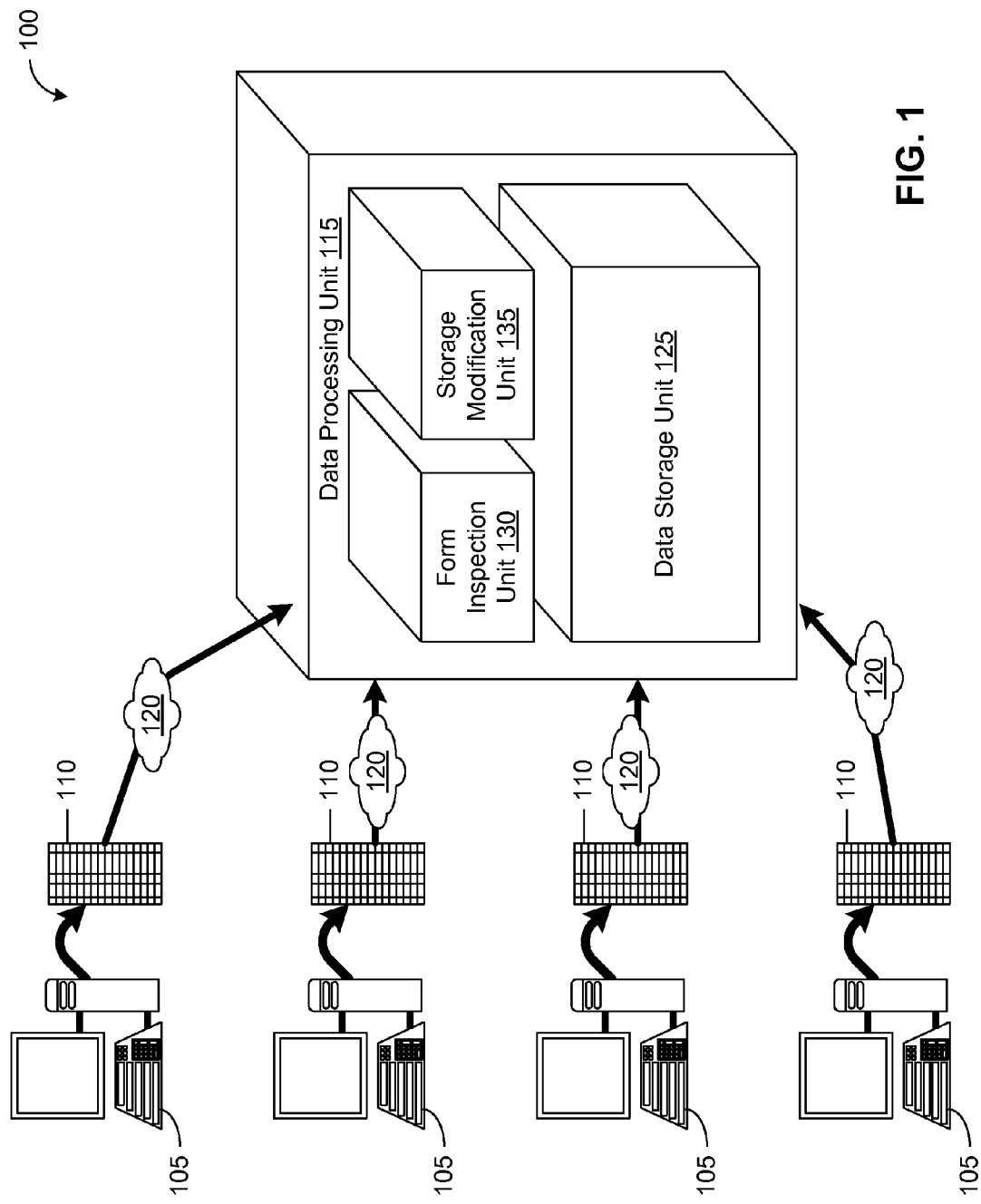
FIG. 1 is a schematic diagram showing an example system for receiving and storing data through electronic forms.

FIG. 1 is a schematic diagram showing an example system 100 for receiving and storing data through electronic forms. The system 100 includes multiple computing devices 105 (for example, desktop computers, laptop computers, personal digital assistants, and the like), configured to transmit forms 110 to a data processing unit 115 over one or more wired or wireless networks 120, for example, the Internet. The forms 110 are created and configured to receive data of different field types. For example, a form 110 is created to receive data and is transmitted to a computing device 105 that is operated by a user who enters data into the form. The user enters data and submits the form, for example, transmits the form via the network 120, to the data processing unit 115.

In some implementations, the data processing unit 115 is configured to automatically interrogate a form 110 to determine properties of the form 110. To do so, the data processing unit 115 includes a form inspection unit 130, a storage modification unit 135, and a data storage unit 125. The data processing unit 115 stores data received in a form 110 in the data storage unit 125. The form 110 can include descriptors depending upon which the storage modification unit 135 can modify the data storage unit 125. The form inspection unit 130 analyzes the received form to identify the included descriptors. The data storage unit 125 is a database that represents one or more computer-readable and computer-searchable tables.

The descriptors specify a storage format in which the data processing unit 115 should store data received from a form 110. In some implementations, the descriptors are fields that have values that are hard-coded into the form 110. The values can represent a storage format for data received in the form 110. For example, a value of a descriptor is a file path of storage, a file name of storage, a table name of storage, and the like. In some implementations, values of a descriptor field can be specified in the form 110 such that, when the data processing unit 115 receives the form 110, the unit 115 can identify the storage format of the received data. For example, data entered into a form can be stored in a particular storage format, such as, an Microsoft Excel™ file, a Microsoft Access™ file, an SQL file, and the like. Alternatively, a user can be allowed to edit values of a descriptor field such that the user specifies the storage format and provides the data, and the data processing unit 115 determines the storage format by identifying the values provided by the user. Whereas in the former implementation, the value of the descriptor field for a form 110 can be constant causing the data processing unit 115 to store the data in the same storage format and storage location, in the latter implementation, the user can be enabled to affect a name of the created object that stores the data.

In some implementations, the data processing unit 115 is configured to provide the storage modification unit 135 with information that the storage modification unit 135 can use to make decisions. In some implementations, the data processing unit 115 can be configured to execute the actions identified by the storage modification unit 135. Further, the data processing unit 115 can provide a common interface for native data destinations. In some implementations, the data processing unit 115 can include data processing apparatus configured to execute computer software instructions tangibly encoded on computer-readable media to perform the aforementioned operations. In some scenarios, the data processing apparatus can be physically stored in the data storage unit 125.

The form inspection unit 130 can be configured to receiving forms 110 or data from the forms 110 or both, and converting them into standard representations, for example, standard XML documents. The storage modification unit 130 can be configured to receive the standard representations and analyze the same to identify destination storage locations of the data. Based on the analysis, the storage modification unit 135 can determine if the destination storage location needs to be modified to accommodate the incoming data. As described later, the modifications can include insertion, creation, altering of data types, and the like.

Figure 2:
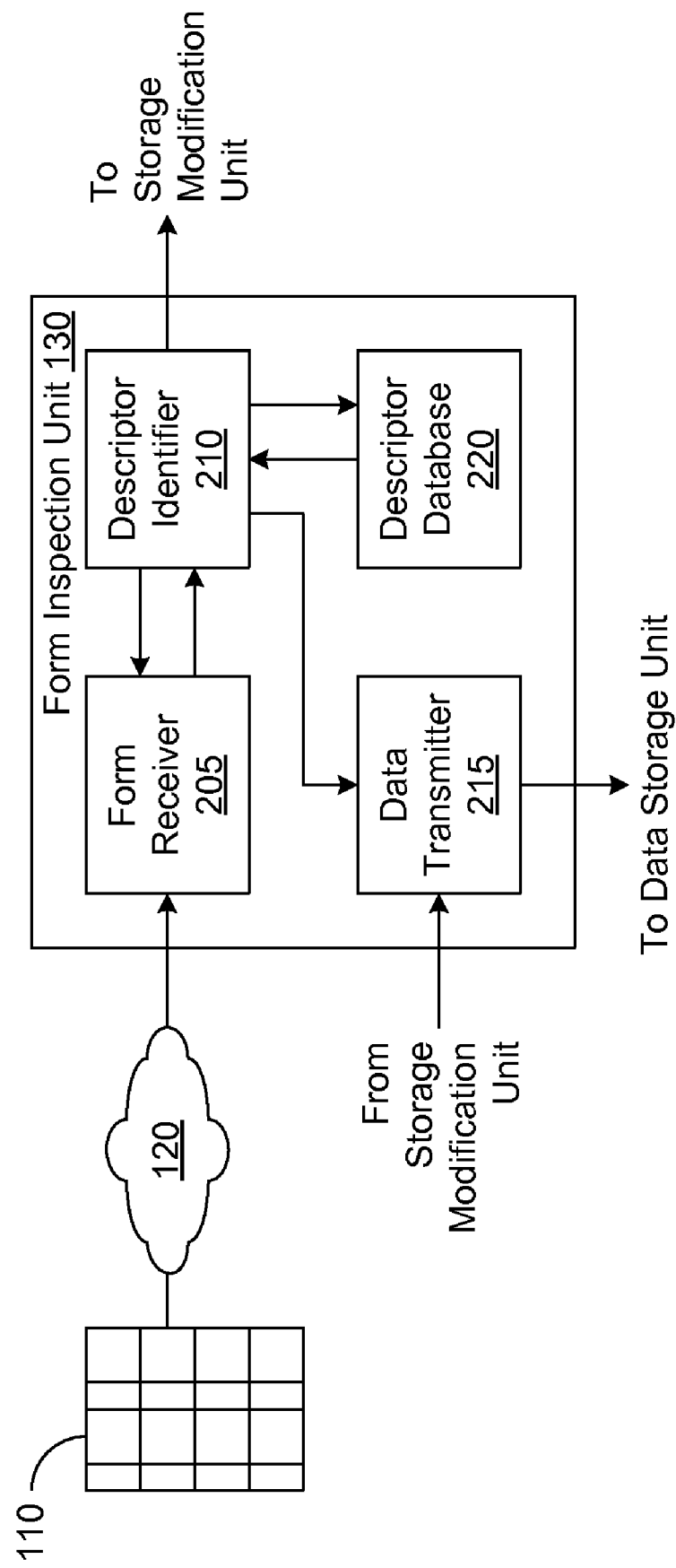
FIG. 2 is a schematic diagram showing an example form inspection unit.

FIG. 2 is a schematic diagram showing an example form inspection unit 130. When the form 110 including the data is transmitted via the networks 120, the form inspection unit 130 receives the form 110. To do so, in some implementations, the form inspection unit 130 includes a form receiver 205. The form inspection unit 130 further includes a descriptor identifier 210 configured to analyze form formats of forms 110, including popular form formats such as Hyper Text Markup Language (HTML) format, Portable Document Format (PDF), Microsoft Word™ format, Microsoft Excel™ format, FLASH, InfoPath, Lotus Forms, and the like. It will be appreciated that the form formats can include any type of formats that can be stored in commercially available databases (for example, Microsoft Access™, Excel™, SQL Server, Lotus Notes, Open Office, Text File, and the like). In general, the form formats can include any format the structure of which can be broken down, transmitted, and interpreted.

In some implementations, the form inspection unit 130 automatically analyzes the structure of the received electronic form to determine properties such as table, field, and field type that should be dynamically mapped to a database or storage format. For example, the data in the form 110 includes descriptor tags that designate a table in which the data should be stored. The descriptor tags are the descriptor fields, the values of which specify the database or storage format in which the data is to be stored. The value of the descriptor field can be, for example, a table name. For example, if the data is to be written to a Microsoft Excel™ file, then the value of the descriptor field can be a name of the excel file or a name of a sheet in the excel file. If the data is to be written to a Microsoft Access™ database, the value of the descriptor tag can be any valid table name. In general, when the data processing unit 115 receives the form 110, the unit 115 is unaware of the database or the storage format in which the received data is to be stored.

In some implementations, the form inspection unit 130 includes a descriptor identifier 210 and a descriptor database 220. The descriptor identifier 210 extracts descriptors encoded in a form 110 and compares the extracted descriptors against a list of possible descriptors that a form 110 can include. The descriptor database 220 stores such a computer-searchable list. It will be appreciated that the list of descriptors in the descriptor database 220 can be varied responsive, for example, to input from a database system administrator. The form inspection unit 130 includes a data transmitter 215 that transmits the data included in the form 110 to the data storage unit 125. The descriptor identifier 210 transmits the extracted descriptors to the storage modification unit 135, described with reference to FIG. 3.

Figure 3:
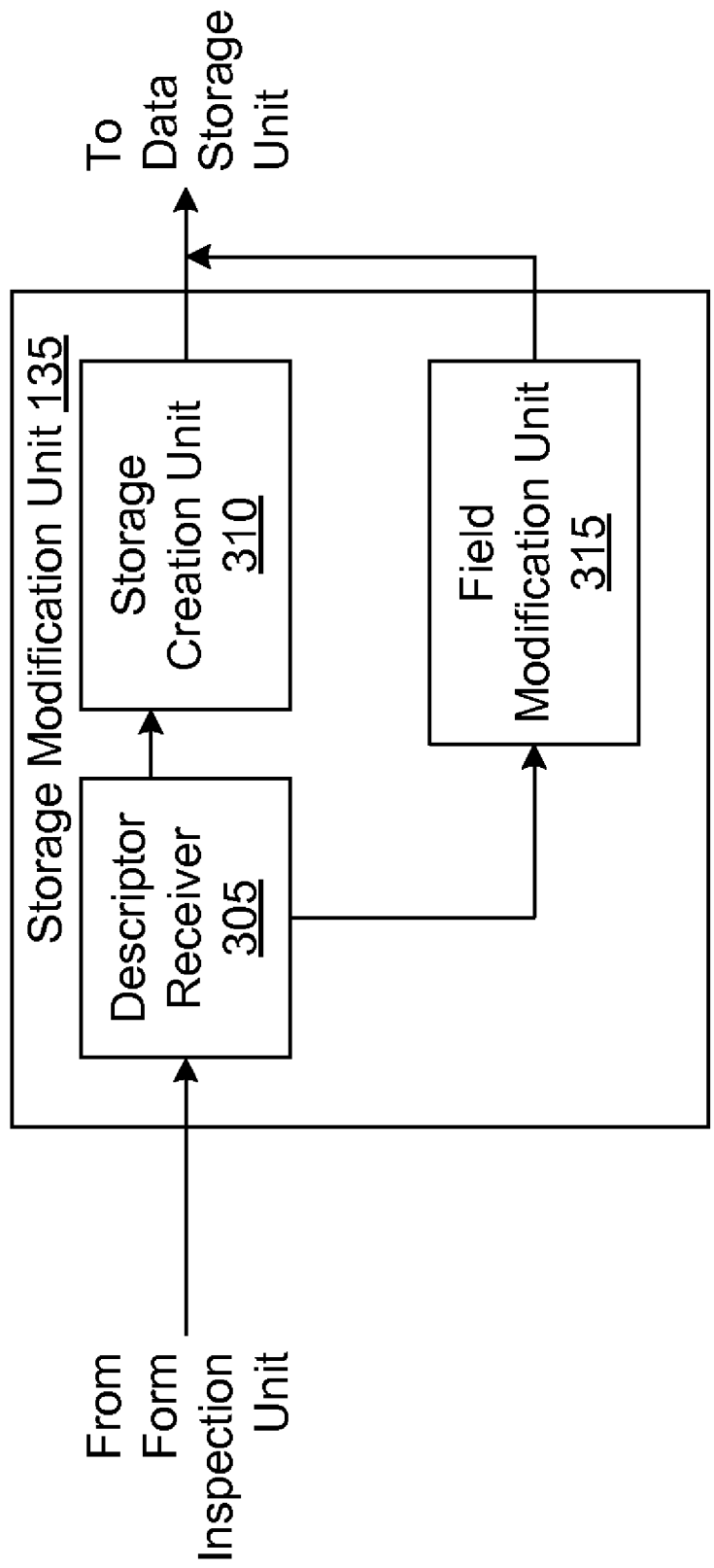
FIG. 3 is a schematic diagram showing an example storage modification unit.

FIG. 3 is a schematic diagram showing an example storage modification unit 135. In some implementations, the storage modification unit 135 is configured to modify the data storage unit 125 to accommodate the data received in the form 110. Modifying the data storage unit 125 can include creating new storage, adding a field to an existing storage, modifying a field in an existing storage, or a combination of them. Thus, the storage modification unit 135 is configured to dynamically modify the data storage unit 125 during the data collection process, for example, without interrupting the flow of data collection. The store modification unit 135 is configured to modify the data storage unit 125 responsive to receiving descriptors extracted by the descriptor identifier 210. For example, the descriptor identifier 210 extracts descriptors included in a form 110 that specify that the form 110 includes data to be stored in a particular format. The form inspection unit 130 transmits the extracted descriptors to the storage modification unit 135. The storage modification unit 135 includes a descriptor receiver 305 configured to receive the extracted descriptors. The storage modification unit 135 further includes a storage creation unit 310 and a field modification unit 315, each operatively coupled to the descriptor receiver 305. The storage creation unit 310 creates additional storage if the descriptor receiver 305 receives a descriptor indicating that the data storage unit 125 requires new storage to store the received data. Similarly, the field modification unit 315 is configured to either create or modify a field in an existing storage in the data storage unit 125.

In some implementations, the descriptor database 220 can additionally store a list of flags that specify operations that the storage modification unit 135 is permitted or not permitted to perform on data in the form 110. The form 110 includes multiple flags that, in a default implementation, are not set so that the storage modification unit 135 is permitted to perform all operations on the incoming data including modifying field types. In some scenarios, a user can set one or more of the flags so that the data processing unit 115 cannot modify the received data. If the form inspection unit 130 detects that such flags are set, then the data transmitter 215 transmits the data to the data storage unit 125 and passes an instruction to the storage modification unit 135 to not modify the data.

Figure 4:
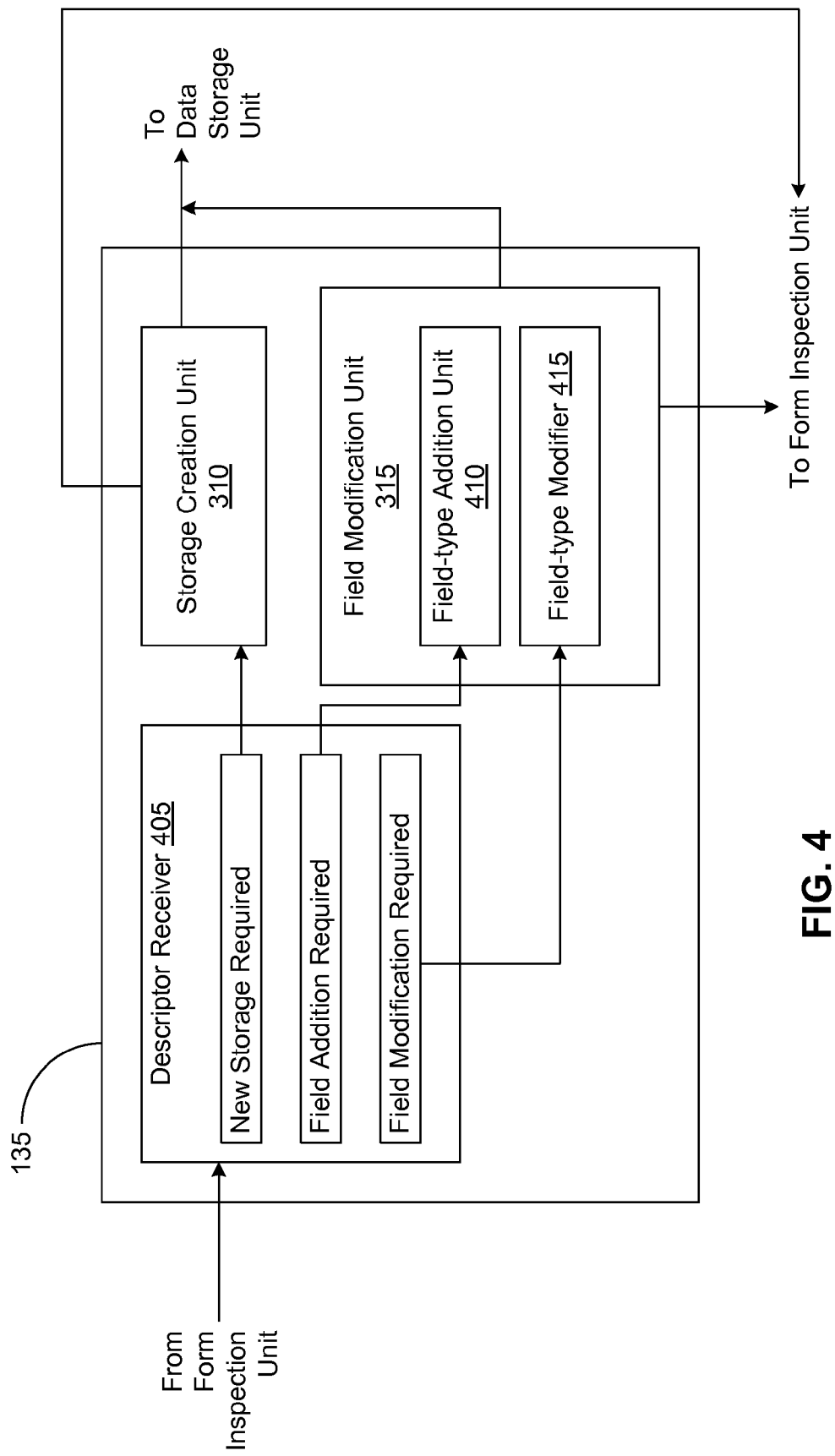
FIG. 4 is a schematic diagram showing an example storage modification unit.

FIG. 4 is a schematic diagram showing an example storage modification unit 135. In some implementations, form inspection unit 130 receives the data in the form 110 in a generic format, for example, XML format. The configuration of the form includes the descriptors specifying format type, source from which the form 110 is received. In some implementations, flags that specify the operations that the data processing unit 115 is and is not permitted to perform can be stored in a configuration separate from and external to the form 110. The form inspection unit 130 analyzes the form 110 to identify the field types of the data in the forms.

Based on the flags, the storage modification unit 135 determines the operations that can be performed on the storage. In some implementations, the data processing unit 135 can modify the storage without restrictions, whereas in other implementations, by specifying information in the form 110, the user can restrict the manipulations that can be performed on the storage to accommodate data in the form 110.

In some scenarios, the descriptor identifier 210 extracts descriptors from the received form 110 and transmits the extracted descriptors to the storage modification unit 135. The storage modification unit 135 determines that the data storage unit 125 does not include a target storage location in which the received data is to be stored. In response, the storage creation unit 310 creates the target storage location. In some implementations, the storage modification unit 135 inspects the data storage unit 125 to determine that a table in which the received data is to be stored does not exist. In response, the storage creation unit 135 creates the table. In some implementations, the storage modification unit 135 determines that a table in the data storage unit 125 does not currently contain a place to store one of the fields from the incoming data. In response, the field-type addition unit 410 alters the table to add the new field. In some implementations, the storage modification unit 135 determines that the field in the table cannot contain the corresponding field from the incoming data. In response, the field-type modifier 415 alters a field to a format that will accommodate the existing data and the incoming data. Finally, the data transmitter 215 transmits the received data to the data storage unit 125. The data storage unit 125 stores the received data in the table as one or more new records.

In some scenarios, the form inspection unit 130 inspects the received data to identify the data that is in a format other than a format that is compatible with the data storage unit 125. The data processing unit 115 is further configured to translate the received structure into a structure that represents the data in a format with which the data storage unit 125 is compatible. Specifically, the data storage unit 125 is configured to store the data in the translated structure. Subsequently, the data processing unit 115 identifies the table in the data storage unit 125 in which the data having the translated structure is to be stored. In some implementations, multiple computer-searchable tables are collectively stored in a single storage location. In some implementations, each computer-searchable table is stored in a different geographical location, and are collectively referred to as a single storage location.

In some scenarios, the incoming data can be in the form of an XML document. Alternatively, or in addition, the incoming data can be in any document that can be collected. Regardless of the structure of the incoming data, the data processing unit 115 is configured to translate the structure into a generic structure with which the data storage unit 125 is compatible. For example, the received data includes data that is received in an "mm/dd/yyyy" format. The data storage unit 125 is configured such that date information is enveloped by "#" symbols. The data processing unit 115 is configured to modify the received data by including "#" symbols to the beginning and end of the date in the "mm/dd/yyyy" format," and transmit the modified data to the data storage unit 125.

Figure 5:
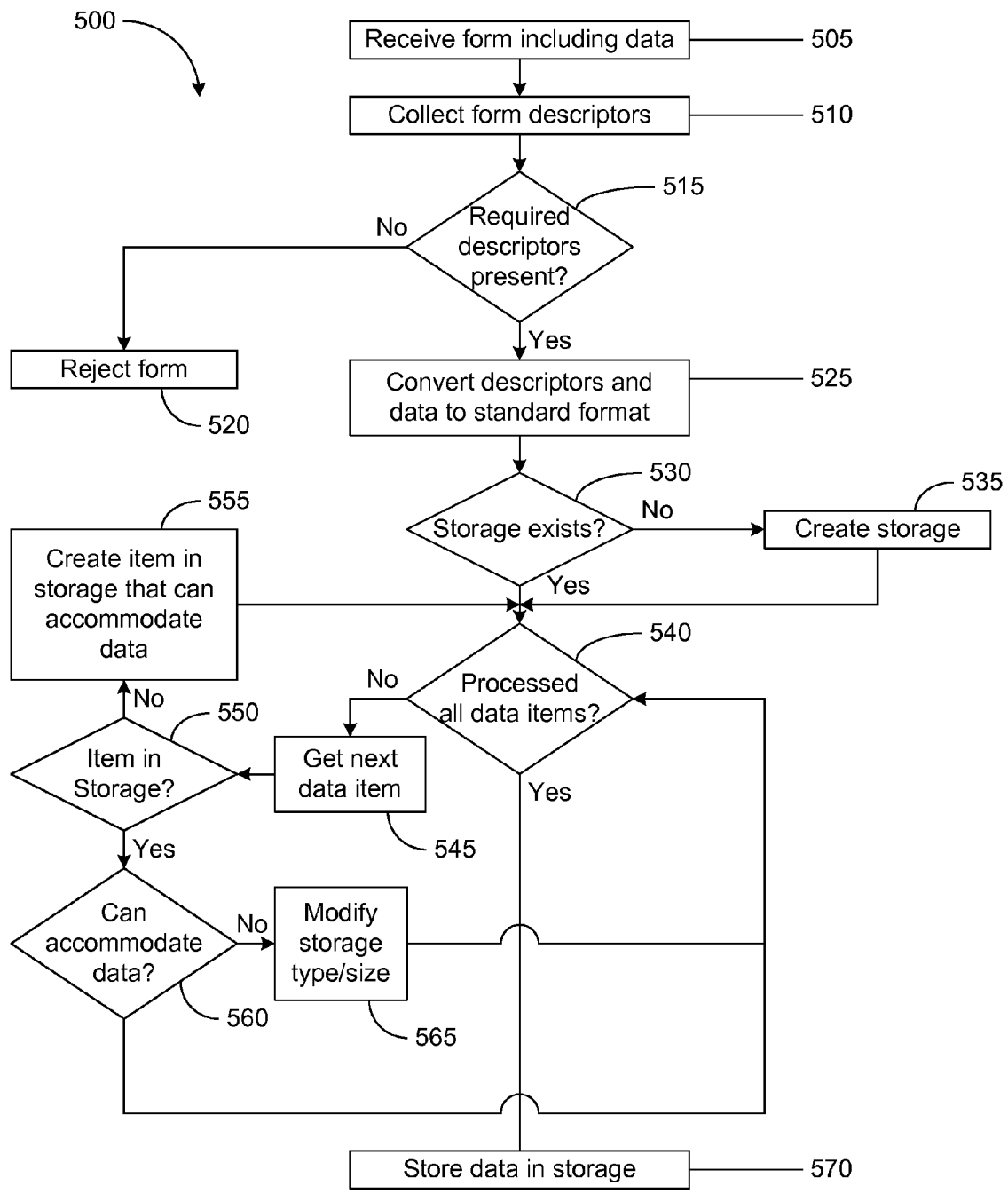
FIG. 5 is an example of a process for dynamically modifying a storage location in response to received data.

FIG. 5 is an example of a process 500 for dynamically modifying a storage location in response to received data. The process 500 receives a form including data (step 505). The process 500 searches the form for descriptors to modify storage in which data is to be stored (step 510). The process 500 checks if the descriptor is in the form (step 520). If the descriptor is not in the form, then the process 500 ends with a rejection of the form (step 520). If the descriptor is in the form, then the process creates an intermediate data structure that includes all of the form data and uses the descriptors to influence the data structure and the data in the data structure (step 525). Then, the process 500 checks if the storage exists (step 530). If the process 500 determines that the storage does not exist, then the process 500 creates storage (step 535). If the process 500 determines that the storage exists, then the process 500 analyzes the individual data items that need to be stored. The process 500 checks to determine if all data items have been processed (step 540). If the process 500 determines that all the data items have not been processed, then the process 500 obtains the next data item (step 545). The process 500 then checks to determine if the data item that is being analyzed is in the storage (step 550). If the process 500 determines that the data item is not in the storage, the process 500 creates a data item of the proper data type and size in the storage (step 555). If the process 500 determines that the data item is in the storage, the process 500 checks if the storage can accommodate the data (step 560). If the process 500 determines that the storage cannot accommodate the data, then the process 500 modifies the storage (step 565). If the process 500 determines that the storage can accommodate the data, then the process 500 returns to check if all the data items have been processed (step 540). When the process 500 determines that all the data items have been processed, then the process 500 stores the data in the storage (step 570).

Figure 6:
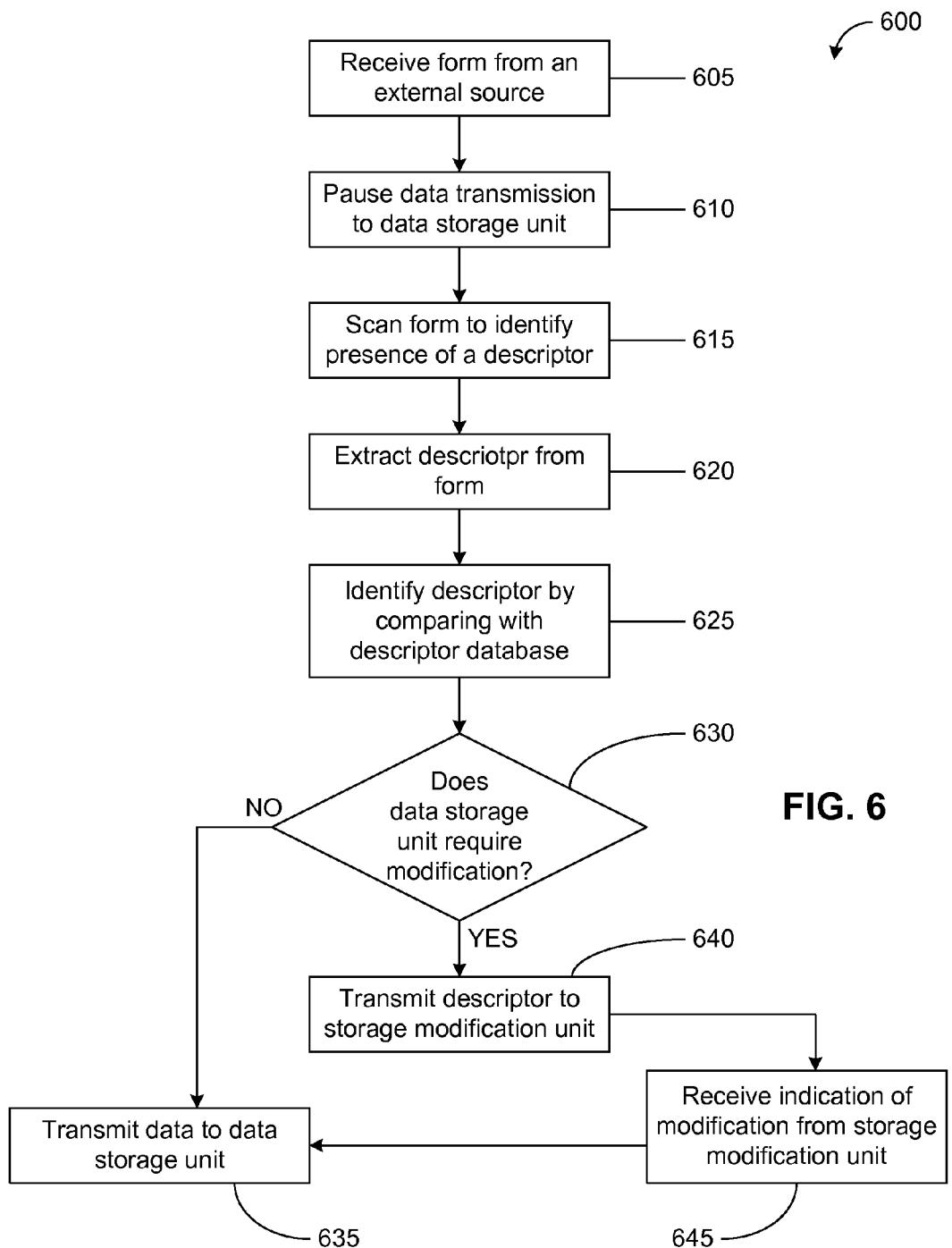
FIG. 6 is an example of a process for modifying a storage location in response to a descriptor included in a received form.

FIG. 6 is an example of a process 600 for modifying a storage location in response to a descriptor included in a received form. The process 600 receives a form from an external source (step 605). The process 600 pauses data transmission to data storage unit (step 610). The process 600 scans the form to identify presence of a descriptor (step 615). The process 600 extracts descriptor from the form (step 620). The process 600 identifies the descriptor by comparing the extracted descriptor with the descriptor database (step 625). The process 600 checks if the data storage unit requires modification (step 630). If the process 600 determines that the data storage unit does not require modification, then the process 600 transmits data to the data storage unit. If the process 600 determines that the data storage unit requires modification, then the process 600 transmits the descriptor to the storage modification unit (step 640). The process 600 receives indication of modification from storage modification unit (645) and then transmits data to the data storage unit (step 635).

Figure 7:
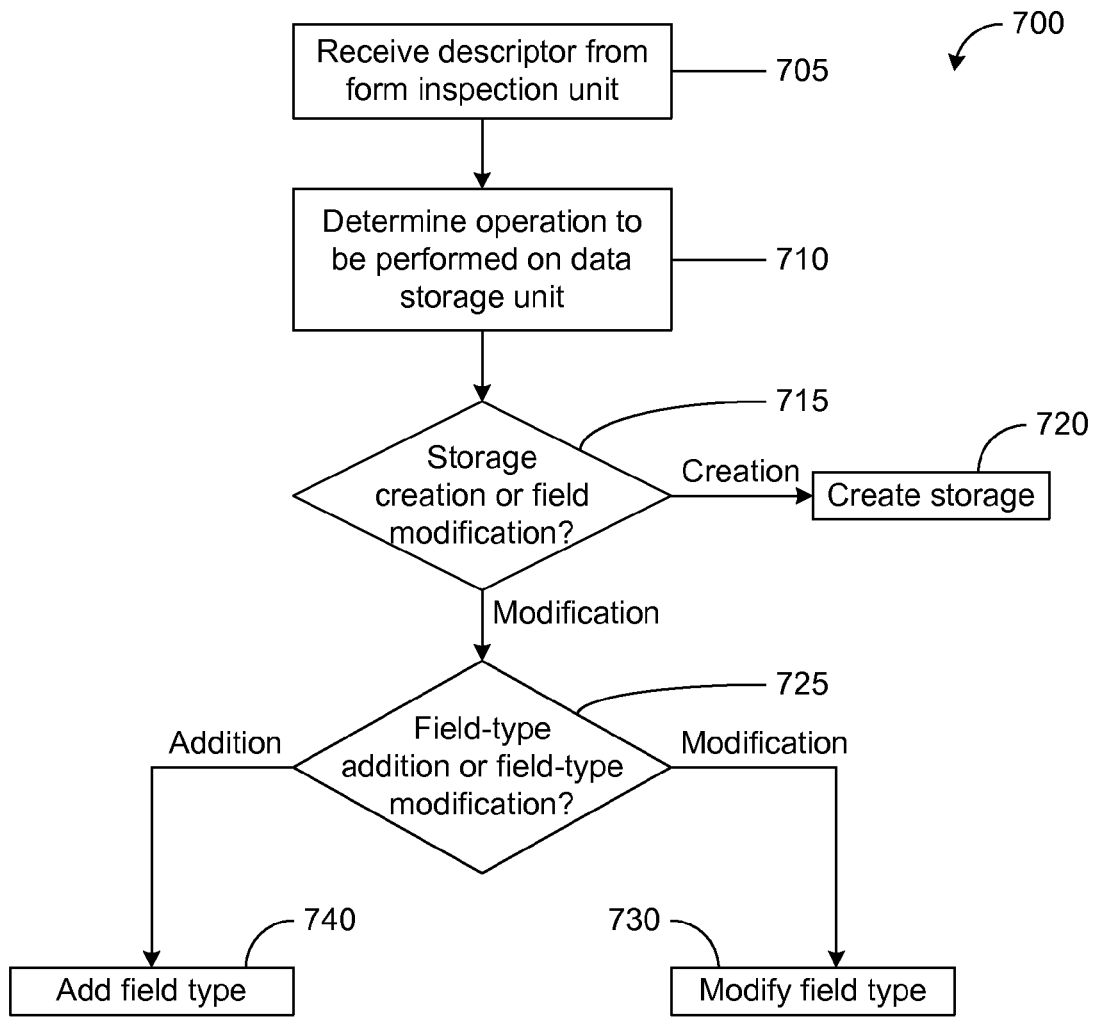
FIG. 7 is an example of a process for modifying a computer-readable table in response to receiving data in a form.

FIG. 7 is an example of a process 700 for modifying a computer-readable table in response to receiving data in a form. The process 700 receives descriptors from the form inspection unit (step 705). The process 700 determines operations to be performed on data storage unit (step 710). The process 700 checks if the storage needs to be created or modified (step 715). If creation, then the process 700 creates storage (step 720). If modification, the process 700 checks if field-type needs to be added or an existing field-type needs to be modified (step 725). If modification, then the process 700 modifies field type (step 730). If addition, the process 700 adds field type (step 740).

In some implementations, the table includes table elements such that each table element is defined as the outermost elements. The table element is made up of record elements and those are made up of field elements. The field elements contain a name and a data type attribute. The value of those field elements is the value of the submitted data. When necessary, that field data may be encoded as Hexadecimal or some other encoding (such as base-64). The algorithm takes this XML document and uses an XML validator to compare it against a Document Type Definition (DTD) or an XML Schema. This ensures that the document is in the proper format.

Generally, the table name is gathered for each table in the storage location in which the incoming data will be stored. Specifically, for each table element in a table, each record element in the table is gathered, and each field element is gathered for each record element. For each field element, a container that holds the field name and data for that field element is created. For each storage location, the required formatting to accommodate the fields, for example, how the field name must be formatted for operations that may need to be done using the field name (such as qualifiers, delimiters, references), is known. In addition, information describing the constitution of a valid field name (such as length allowed, character set allowed) is also known.

Storage location specific code is used to determine the storage location specific field definition that will be needed to store the field data in the storage location. This is done by looking at the generic field data type from the XML field element and determining a list of data types for that storage location that can hold data of that generic type. Each of these storage location specific types may also contain properties that bound the type. For example, if the generic type is text, the storage location may have several internal types that can store text and some of those internal types may have properties that limit how much text can be stored in a field of that specific type. Once those types and bounds are established, the actual data from the field element of the incoming XML data is analyzed and the best-fit internal storage location type is assigned to the container representing that field. The bounds used are also assigned to the container representing that field.

When the end of a record element is reached, i.e., all fields for the record having been looked at, the storage location in which the data is to be stored is analyzed. If the storage location itself does not exist and permissions given to it allow, and it has knowledge of how to do so, the storage location is created. Subsequently, a list of all the tables that are found in the storage location are also created. For each storage location, information describing the manner in which the table name is formatted for operations that may need to be done using the table name is also known. Further, the description of a valid table name is also known. The list of table names is searched to obtain the table name gathered from the current table element in the XML incoming data. If that table is not found, then the table is created. The specifics of how the table is created is target dependent, but the storage location specific field containers are used to provide the specifics needed.

Alternatively, if the table is found and the configuration allows it, the table is attempted to be altered. A list of fields from the existing table is built and containers for these fields are created in the same way described above for the field elements from the incoming XML data. In some implementations, any field from the incoming XML data that is not found in the list of existing table fields will be added using a storage location-specific alter action, the specifics of which is target dependent. In some implementations, any field from the incoming XML data that is found in the list of existing table fields will have a corresponding container representation compared against the container representation of the existing field. Use storage location-specific knowledge, a common field type can be found into which both the containers' data will fit. In other words, a container representation which can safely represent both the existing table data for the field and this incoming data for the field can be created. To do so, in some implementations, a new container representation that holds slightly more data of the same type can be created.

Alternatively, a completely new field type can be created that can hold the data such that there is no loss or truncation of data. For example, assume that the old data is character type data and the current field definition is for the field to hold 200 characters of data and the type in the table is able to hold up to 255 characters. If the new data is also character type data and is 200 characters long or less, then no change will be necessary. If the new data is 210 characters, the field will be altered to be able to hold 210 characters (the type is "scaled" up). If the new data is 300 characters (or more than 255), some other data type will need to be found that will hold up to 300 characters or more. In some implementations, if a common type cannot be found, an error will be reported. Using rules for every supported storage location format, it can be determined if a common data type can be found from any data type to any other data type.

After going through the storage location and table creation and the field creation and alteration, the new data is inserted as a new record in the table. The data to be inserted is in the container representation. The information on formatting table names, field names, and field data, along with qualifiers and delimiters and insert syntax is used to insert the data row. An error or success can be reported. In this manner, new records are inserted into one table. The above-described techniques can be repeated to modify one or more tables in one or more other storage locations.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A form may, but need not, correspond to a file. A form may be stored in a portion of a file that holds other forms and/or documents, in a single file dedicated to the form in question, or in multiple coordinated files. Further, a form can include multiple pages, each of which includes multiple fields of one or more field types. Also, it will be appreciated that the aforementioned methods need not be driven by a form. For example, the data can be transferred to the data processing unit 115 through any type of interface other than a form.

In some implementations, the data processing unit 115 can be configured to connect to a data storage unit 125 and receive data from the data storage unit 125 that can be of one or more types, for example, MS-Access, MS-Excel, SQL, and the like. The data processing unit 115 can merge the data into forms 110, for example, PDF forms, HTML forms, and the like, and can transmit the forms, for example, via e-mail. Specifically, for example, the data processing unit 115 can route the forms to users thereby allowing the data in the form to be collected into a database having a format chosen by the users.

Such implementations can be applied, for example, in scenarios in which owners of a local data storage unit transmits data to the data processing unit 115 with the intention that the data be merged into PDF forms and e-mailed to a group of users. In other scenarios, the owner can intend for the data to be collected to a different database in another geographic location.

What is claimed is:

1. A method comprising:
   receiving, by data processing apparatus, a form that includes data of one or more data types, each of the one or more data types associated with a corresponding field type;
   identifying, by the data processing apparatus, the one or more data types of the data included in the form;
   accessing, by the data processing apparatus, a computer-readable storage location configured to store data of at least one field type;
   identifying, by the data processing apparatus, the one or more field types that the storage location is configured to store;
   comparing, by the data processing apparatus, the identified one or more data types against the identified one or more field types;
   determining, by the data processing apparatus, that a portion of the data is of a data type corresponding to a first field type that the storage location is not configured to store;
   modifying, by the data processing apparatus, the storage location to store data of the data type corresponding to the first field type triggered in response to determining that the portion of the data is of a data type corresponding to a first field type that the storage location is not configured to store, the modifying configuring the storage location to store the portion of the data of the first field type; and
   storing the received data in the modified storage location.

2. The method of claim 1, wherein the modifying comprises creating, in the storage location, the first field type in addition to the one or more field types that the storage location is configured to store.

3. The method of claim 1, wherein the modifying comprises converting a field type of the one or more field types to the first field type.

4. The method of claim 3, wherein converting the field type of the one or more field types to the first field type comprises:
   determining, from the one or more data types, a first size associated with a data type corresponding to the first field type;
   determining a second size associated with the field type of the one or more field types that is to be modified; and
   modifying the second size to the first size.

5. The method of claim 1, further comprising extracting the received data from the form prior to storing the received data in the modified storage location.

6. The method of claim 1, further comprising scanning the received form to determine one or more field types of the data that is included in the form.

7. The method of claim 1, wherein the storage location is a computer-readable table.

8. A computer-readable medium tangibly encoding computer software instructions executable by data processing apparatus to perform operations comprising:
   receiving, by data processing apparatus, a form that includes data of one or more data types, each of the one or more data types associated with a corresponding field type;
   identifying, by the data processing apparatus, the one or more data types of the data included in the form;
   accessing, by the data processing apparatus, a computer-readable storage location configured to store data of at least one field type;
   identifying, by the data processing apparatus, the one or more field types that the storage location is configured to store;
   comparing, by the data processing apparatus, the identified one or more data types against the identified one or more field types;
   determining, by the data processing apparatus, that a portion of the data is of a data type corresponding to a first field type that the storage location is not configured to store;
   modifying, by the data processing apparatus, the storage location to store data of the data type corresponding to the first field type triggered in response to determining that the portion of the data is of a data type corresponding to a first field type that the storage location is not configured to store, the modifying configuring the storage location to store the portion of the data of the first field type; and
   storing the received data in the modified storage location.

9. The medium of claim 8, wherein the operations for modifying comprises creating, in the storage location, the first field type in addition to the one or more field types that the storage location is configured to store.

10. The medium of claim 8, wherein the operations for modifying comprises converting a field type of the one or more field types to the first field type.

11. The medium of claim 10, wherein the operations for converting the field type of the one or more field types to the first field type comprises:
   determining, from the one or more data types, a first size associated with a data type corresponding to the first field type;
   determining a second size associated with the field type of the one or more field types that is to be modified; and
   modifying the second size to the first size.

12. The medium of claim 8, the operations further comprising extracting the received data from the form prior to storing the received data in the modified storage location.

13. The medium of claim 8, the operations further comprising scanning the received form to determine one or more field types of the data that is included in the form.

14. A system comprising:
   a form inspection unit to receive a form that includes data of one or more data types, each of the one or more data types associated with a corresponding field type;
   a data storage unit to receive the data from the form inspection unit and to store the data of at least one field type; and
   a storage modification unit operatively coupled to the form inspection unit and the data storage unit, the storage modification unit to perform operations comprising:
      identifying the one or more data types of the data included in the form,
      identifying the one or more field types that the data storage unit is configured to store,
      comparing the identified one or more data types against the identified one or more field types,
      determining that a portion of the data is of a data type corresponding to a first field type that the data storage unit is not configured to store, and
      modifying the data storage unit to store data of the data type corresponding to the first field type triggered in response to determining that the portion of the data is of a data type corresponding to a first field type that the storage location is not configured to store, the modifying configuring the storage location to store the portion of the data of the first field type,
   wherein the data storage unit is configured to store the data pursuant to the modifying by the storage modification unit.

15. The system of claim 14, wherein the form inspection unit further comprises:
   a form receiver to receive the form from an external source, the form including a descriptor indicating that the form includes data of a data type corresponding to the first field type;
   a descriptor database including one or more descriptors, each descriptor corresponding to a type of modifying to be performed on the data storage unit, wherein the descriptor database is configured to extract the descriptor included in the form; and
   a data transmitter configured to transmit the data to the data storage unit.

16. The system of claim 15, wherein the data transmitter transmits the data to the data storage unit upon receiving an indication from the descriptor identifier related to the modifying of the received data.

17. The system of claim 16, wherein the storage modification unit comprises:
   a descriptor receiver to receive the descriptor from the form inspection unit; and
   a storage creation unit to create one or more field types including the first field type in the data storage unit based upon the received descriptor.

18. The system of claim 17, wherein the storage modification unit comprises a field modification unit to modify a field type of the one or more field types to another field type.

19. The system of claim 18, wherein the other field type is the first field type.

20. The system of claim 18, wherein the field modification unit comprises a field-type addition unit configured to create the first field type in the data storage unit.

* * * * *